(12) United States Patent
Lederer et al.

(10) Patent No.: US 7,862,046 B2
(45) Date of Patent: Jan. 4, 2011

(54) MECHANICAL SEAL ASSEMBLY

(75) Inventors: Günther Lederer, Geretsried (DE); Andreas Schrüfer, Wolfratshausen (DE); Peter Dröscher, Gerestried-Gelting (DE); Petia Philippi, Wolfratshausen (DE); Armin Laxander, Ebenhausen (DE)

(73) Assignee: EagleBurgmann Germany GmbH & Co. KG, Wolfratshausen (DE)

( * ) Notice: Subject to any disclaimer, the term of this patent is extended or adjusted under 35 U.S.C. 154(b) by 0 days.

(21) Appl. No.: 12/313,104

(22) Filed: Nov. 17, 2008

(65) Prior Publication Data

US 2009/0134584 A1 May 28, 2009

(30) Foreign Application Priority Data

Nov. 23, 2007 (DE) .................. 20 2007 016 407 U

(51) Int. Cl.
*F16J 15/34* (2006.01)
(52) U.S. Cl. ....................................... 277/348; 277/390
(58) Field of Classification Search ................. 277/348, 277/377, 358, 379, 380, 382, 385, 390
See application file for complete search history.

(56) References Cited

U.S. PATENT DOCUMENTS

| | | | |
|---|---|---|---|
| 2,672,357 A | 3/1954 | Voytech | |
| 3,479,039 A | 11/1969 | Pinkas | |
| 3,582,090 A | 6/1971 | Lott et al. | |
| 6,076,830 A | 6/2000 | Wu et al. | |
| 6,293,555 B1 | 9/2001 | Sedy | |
| 6,494,460 B2 | 12/2002 | Uth | |
| 2002/0190480 A1* | 12/2002 | Gregoire | ..................... 277/602 |

FOREIGN PATENT DOCUMENTS

| | | |
|---|---|---|
| DE | 692 18 599 T2 | 11/1997 |
| DE | 201 10 824 U1 | 11/2001 |
| EP | 1 253 359 A | 10/2002 |
| WO | WO 2006/040865 | 4/2006 |

OTHER PUBLICATIONS

European Searach Report dated Apr. 1, 2009.
German Search Report dated Jun. 24, 2008.

* cited by examiner

*Primary Examiner*—Shane Bomar
*Assistant Examiner*—Gilbert Y Lee
(74) *Attorney, Agent, or Firm*—Scott D. Wofsy; Edwards Angell Palmer & Dodge LLP

(57) ABSTRACT

A mechanical seal assembly including at least one pair of co-operating seal rings, one of which is provided for common rotation with a rotating component and the other of which is provided rotationally fixed at a stationary component. One of the seal rings is axially movable and axially biased with a biasing force against the other seal ring, the biasing force being transmittable through a force transmitting ring to the respective seal ring, in order to bias facing sliding surfaces of the seal rings, between which a sealing gap is formed during operation, in a mutual sealing engagement, and a secondary sealing assembly provided at the force transmitting ring for sealing the axially movable seal ring with respect to at least one circumferential guiding surface of a guiding component guiding the movement of the seal ring and the force transmitting ring.

5 Claims, 1 Drawing Sheet

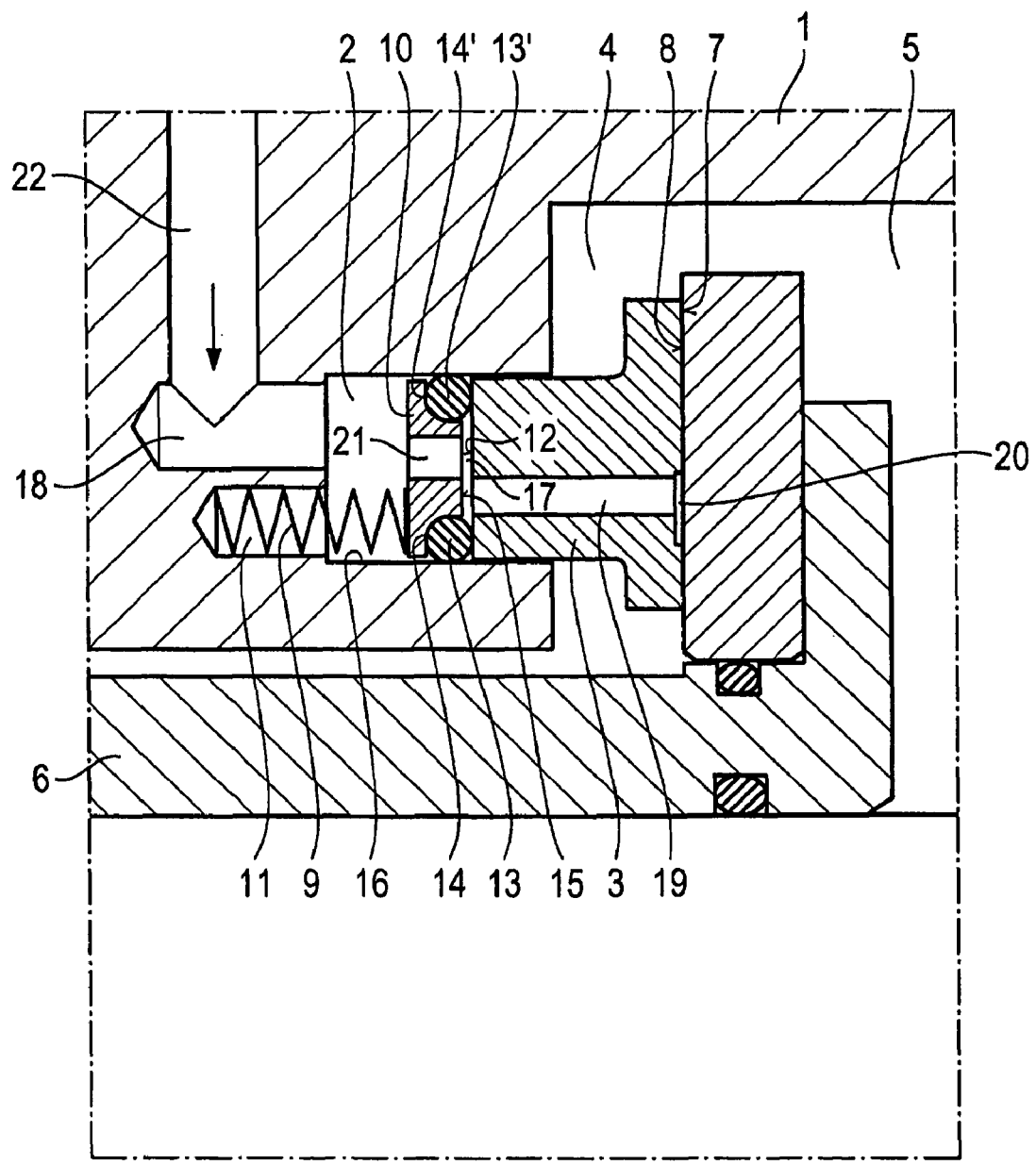

MECHANICAL SEAL ASSEMBLY

The invention relates to a mechanical seal assembly and in particular to such a mechanical seal assembly having at least one pair of co-operating seal rings, one of which is axially movable and axially biased with a biasing force against the respectively other seal ring, and a secondary sealing assembly for sealing the axially movable seal ring with respect to at least one circumferential guiding surface of a guiding component guiding the movement of the seal ring and a biasing force transmitting ring. Such a mechanical seal assembly is e.g. known from U.S. Pat. No. 3,479,039 A.

In the known mechanical seal assemblies, the sealing of the seal ring with respect to a housing is performed by O-rings which are received in grooves in the seal ring. It is also known (WO 2006/040865) to provide one or more O-rings between a housing and the periphery of the seal ring in axially open-ended recesses in the seal ring or the housing, respectively. In any case, the sealing effect of the O-rings is based on an oversize to be provided with respect to the gap which has to be sealed, such that an axial movement of the seal ring occurs against high friction resistances and therewith the mobility important for the functioning of the seal ring is restricted accordingly.

It is an object underlying the invention to provide a generic mechanical seal assembly in which the axial mobility of the respective seal ring is not or substantially less affected by the secondary sealing assembly and which simultaneously simplifies the mounting thereof.

According to the invention, the secondary sealing assembly is provided at a force transmitting ring, while the axially movable seal ring is devoid of any grooves or the like for receiving the secondary sealing members, such as O-rings. The axial mobility of the seal ring is therefore not affected by such secondary sealing members. The secondary sealing members, which are preferably O-rings, are retained and arranged at the force transmitting ring in a specific manner such that a radial sealing effect to a substantial extend is only generated when the secondary sealing members are loaded by an axial force which effects a radial expansion of the secondary sealing members. Therefore, the secondary sealing members do not need to have an oversize with respect to the gap to be sealed, such that the force transmitting ring, together with the secondary sealing members, can be moved axially unresisted by frictional resistances relative to the surface to be sealed. Therefore, no engagement with guiding circumferential surfaces guiding the force transmitting ring is given without action of an axial biasing force to the secondary sealing members. Therefore, the secondary sealing members do not or only minimally protrude beyond the force transmitting ring. This simplifies the mounting of the mechanical seal assembly substantially and further guarantees that the radial sealing may be adapted exactly to the requirements of the respective mechanical seal assembly. Nevertheless, commercially available secondary sealing members can be used. It is a further feature of the invention that the secondary sealing members slightly protrude axially from the force transmitting ring, and therewith an abutment between the force transmitting ring and the seal ring is created, said abutment not being rigid, but elastically flexible. Due to this, the seal ring can change its position with respect to the force transmitting ring to a certain extent, which has a self-compensating effect on the configuration of the sealing gap such that same maintains its desired configuration. According to the invention, the biasing force acts on the seal ring through the force transmitting ring and the secondary sealing members and is therefore practically not weakened by the secondary sealing members.

According to a further development of the invention, it may further be provided that the force transmitting ring is interspersed with an axial aperture and on the other side a flow passage is provided in the seal ring, said passage opens out at a sealing gap promoting recess in the seal ring surface. Therewith, a pressure medium can be supplied through the force transmitting ring to the sealing gap promoting recess, in order to prematurely effect a sealing gap formation between the co-operating seal rings of the seal ring pair, wherein the force transmitting ring is maintained in a pressure-released state with respect to the pressure medium. In order to enable an assembly without problems in aligning the force transmitting ring with its axial aperture and the seal ring with its flow passage, the secondary sealing members are formed such that they secure a predetermined axial distance between the force transmitting ring and the seal ring also upon existence of an axial biasing force on the force transmitting ring. Therewith, a circumferentially extending gap space is maintained, such that a connection between the axial aperture of the force transmitting ring and the flow passage in the seal ring is guaranteed in the assembled state due to this gap space. Therewith, it is also possible that the axial aperture in the force transmitting ring and the flow passage in the seal ring are provided on different diameters. Concerning further developments, reference is made to the claims.

BRIEF DESCRIPTION OF THE DRAWING

FIG. 1 is a longitudinal sectional view of an exemplary embodiment of a mechanical seal assembly constructed in accordance with the present invention.

DETAILED DESCRIPTION

In the following, the invention is explained in more detail on the basis of the drawing which shows, in a longitudinal sectional view, a preferred embodiment of an inventive mechanical seal assembly.

In the drawing, reference numeral 1 designates a stationary component, in particular a housing of the mechanical seal assembly, and reference numeral 2 designates a guiding ring space axially introduced into the housing or an annular recess having an open end at one end side, into which an axial lug portion 3 of a rotationally fixed, but axially movable seal ring 4 protrudes such that the seal ring 4 is retained in the guiding ring space 2 and is axially guided.

The rotationally fixed seal ring 4 co-operates with a seal ring or counter ring 5 which is mounted on a sleeve 6 for common rotation, which can be set and mounted on a rotating component (shaft) to rotate together therewith. Upon a rotation of the rotating component, the seal ring 5 is therefore caused to rotate as well, whereas the seal ring 4 is retained rotationally fixed with respect to the housing 1 by appropriate means preventing rotation (not shown). Such means are known to the skilled person and do not need to be explained in more detail.

The seal rings 4, 5 comprise opposite sliding or sealing surfaces 7 and 8 between which a sealing gap is formed during operation for sealing the surrounding area at one periphery with respect to the surrounding area at the other periphery of the seal ring pair. Upon standstill of the mechanical seal assembly, the sliding surfaces 7, 8 are maintained in a sealing engagement with a biasing force.

For this purpose, a biasing device 9, which may consist of one or more biasing springs arranged circumferentially about the guiding ring space 2, is provided to exert said biasing force onto the seal ring 4. The biasing force of the biasing device 9 does not act directly on the seal ring 4, but through a force transmitting ring 10 which is arranged in the guiding ring space 2 to be axially movable. One end of the biasing device 9 is supported at the force transmitting ring 10 and the other end thereof is supported at the housing 1, preferably at the bottom of blind hole bores 11 provided in the housing 1. Due to the effect of the biasing force, the force transmitting ring 10 experiences an axial movement in the guiding ring space 2 toward the adjacent face end 12 of the seal ring 4, such that the biasing force is transmitted to the seal ring.

According to the invention, the force transmitting ring 10 comprises a pair of sealing members 13, 13' made of an elastic material, such as an elastomer, which serve to seal the seal ring 4 with respect to the housing 1. Preferably, the sealing members are commercially available O-rings which are arranged in circumferentially extending recesses 14, 14' having a cross-section adapted to the cross-sectional configuration of the sealing members 13, 13', e.g. a pitch-circular cross-section, in a corner region between the outer and inner peripheries and an end face 15 of the force transmitting ring 10 facing the seal ring 4, such that the cross-section of each sealing member 13, 13' protrudes axially beyond the end face 15 by a suitable small distance of e.g. approx. 0.5 to 1 mm upon a cross-sectional dimension of 3.5 to 7.0 mm. Preferably, the sealing members 13, 13' also protrude beyond the outer and inner peripheries of the force transmitting ring 10 by a small distance when no biasing force is existent. This small oversize of the sealing members 13, 13' provided without biasing force in the radial direction is smaller than the oversize provided without biasing force in the axial direction and preferably ranges between 0 and 0.2 mm. It is particularly preferred that the sealing members 13, 13' do not feature an oversize in the radial direction beyond the force transmitting ring 10 without biasing force.

Preferably, the sealing members 13, 13' have the same cross-sectional dimensions, and their cross-sectional centers lie on a common radial plane.

The sealing members 13, 13' are configured to engage with adjacent inner and outer peripheral surfaces 16, 18 of the guiding ring space 2, when the sealing members 13, 13' experience a radial expansion due to an axial force being exerted. Without said axial force, no engagement or only a very small engagement of the sealing members 13, 13' with the peripheral surfaces 16, 18 occurs, such that the axial mobility of the force transmitting ring 10 is not affected under these conditions.

When the force transmitting ring 10 with the sealing members 13, 13' is pressed against the adjacent face end 12 of the seal ring 4 by the biasing force exerted by the biasing device 9, this results in the formation of a gap space 17 between the force transmitting ring 10 and the face end 12 of the seal ring 4 which is limited and sealed at its outer and inner peripheries by the sealing members 13, 13'. Further, the axial force acting on the sealing members 13, 13' has the effect that same experience a radial expansion and therewith enter into a sealing engagement with the peripheral surfaces 16, 18 of the guiding ring space 12 in order to seal the seal ring 4 with respect to the housing 1.

Therewith, the invention enables the insertion of the force transmitting ring 10 into the guiding ring space 12 without any frictional resistance from the sealing members 13, 13'. Further, the consequence of the axial engagement between the force transmitting ring 10 and the seal ring 4 through the sealing member 13, 13' is that the engagement is not rigid, but flexible, and therefore positional deviations between the seal ring 4 and the force transmitting ring 10 can be compensated.

As is further shown, the rotationally fixed seal ring 4 is axially interspersed with a flow passage 19 which opens out at one end at the face end 12 and on the other end into an annular recess 20 having a suitable small depth, which is inserted into the sliding surface of the seal ring 4. If desired, also a plurality of such flow passages may be provided. Through each flow passage 19, a pressure medium, e.g. a gas or a liquid, may be supplied into the annular recess 20 in order to effect or promote the sealing gap formation between the sliding surfaces 7, 8. The force transmitting ring 10 is interspersed with a passage 21 which opens out on the one end within the area of the end face 15 enclosed by the sealing members 13, 13' and on the other end into the guiding ring space 2 into which, on the other side, a flow passage 22 provided in the housing 1 opens. If desired, also a plurality of such flow passages 22 may be provided. A flow medium supplied into the or each flow passage 22, as indicated by the arrow, may therefore be supplied through the guiding ring space 2, the borehole 21 in the force transmitting ring 10, the gap 17 and the flow passage 19 toward the recess 20 in the sliding surface 7 of the seal ring 4. Hereby, the sealing members 13, 13' protrude a little, also when a biasing force in the axial direction is present, to maintain the annular gap space 17 between the force transmitting ring 10 and the seal ring 4. This enables that an alignment of the force transmitting ring 10 and the seal ring 4 in the circumferential direction may be omitted when assembling the mechanical seal assembly, since the connection between the borehole 21 in the force transmitting ring 10 and the flow passage 19 in the seal ring 4 is maintained by the gap space 17, also upon existence of a biasing force. Further, it is therewith possible that the borehole 21 and the flow passage 19 are arranged on different diameters. This results in a particular compact structure, since the borehole 21 and the flow passage may respectively be arranged independently of each other in the force transmitting ring 10 and in the seal ring 4. As results from the FIGURE, a diameter on which the borehole 21 is arranged is larger than a diameter on which the flow passage 19 is arranged. In order to provide a sufficient contact surface for the spring members of the biasing device 19, the borehole 21 in the force transmitting ring 10 is arranged asymmetrically with respect to an intermediate diameter of the force transmitting ring, wherein the borehole 21 is located more closely to the sealing member 13', as shown in the FIGURE.

In the preferred embodiment of the invention described above, the force transmitting ring 10 comprises a pair of sealing members 13, 13' which are arranged near the inner or outer periphery of the force transmitting ring 10 according to the invention. If desired, also only one such sealing member may be arranged at the force transmitting ring in the inventive manner, such that a sealing with respect to only one circumferential guiding surface would be created, whereas the sealing with respect to the other circumferential guiding surface could be performed otherwise, unless such a sealing is completely omitted. Further, it is obvious that the described measures for supplying a flow medium to the recess provided in the sliding surface of the rotationally fixed seal ring can be omitted, in particular if the sealing gap formation is obtained or promoted by other suitable measures, such as promoting recesses in the sealing surface, as it is described in more detail in Burgmann, Gas Seals, Selbstverlag 1997, page 17.

The invention claimed is:
1. A mechanical seal assembly comprising
at least one pair of co-operating seal rings, one of which is provided for common rotation with a rotating component and the other of which is provided rotationally fixed at a stationary component, one of the seal rings being axially movable and axially biased with a biasing force against the respectively other seal ring, said biasing force being transmittable through a force transmitting ring to the respective seal ring, in order to bias facing sliding surfaces of the seal rings, between which a sealing gap is formed during operation, in a mutual sealing engagement, and a secondary sealing assembly provided at the force transmitting ring for sealing the axially movable seal ring with respect to two circumferential guiding surfaces of a guiding component guiding the movement of the seal ring and the force transmitting ring, wherein the secondary sealing assembly includes a pair of annular sealing members, made of an elastic material, wherein one sealing member is retained near the inner periphery and the other sealing member is retained near the outer periphery of the force transmitting ring of the end face facing the seal ring, such that the sealing members axially protrude beyond the force transmitting ring, are configured to sealingly engage simultaneously with the seal ring and the circumferential guiding surfaces and are configured to be axially loaded with the biasing force, wherein the sealing members are retained at the force transmitting ring such that the sealing members are configured to sealingly engage with the circumferential guiding surfaces by effect of the axial biasing force through radial expansion, whereas such engagement is substantially prevented if no biasing force is effective;

wherein the axial movable seal ring is devoid of any grooves for receiving the secondary sealing members, and wherein the circumferential guiding surfaces are coaxial and delimit a guiding ring space therebetween, in which the force transmitting ring and at least an axial portion of the seal ring is received, wherein one sealing member is configured to sealingly engage with one of the circumferential guiding surfaces and the other sealing member is configured to sealingly engage with the other circumferential guiding surface, while the sealing members simultaneously delimit an axial gap space region circumferentially at their end face, wherein each sealing member is an O-ring, wherein the sealing members have substantially the same cross-sectional dimensions, and wherein cross-sectional centers of the sealing members are arranged on a common radial plane.

2. The mechanical seal assembly of claim 1, wherein the force transmitting ring is interspersed with an axial aperture, wherein the aperture at one end opens out within the gap space region.

3. The mechanical seal assembly of claim 2, wherein a flow passage in the seal ring, which at one end opens out at the face end thereof facing the force transmitting ring in alignment with the axial gap space region and at the other end opens out into the sliding surface thereof, in order to supply a flow medium promoting the sealing gap formation between the co-operating sliding surfaces.

4. The mechanical seal assembly of claim 1, wherein the rotationally fixed seal ring is axially movable.

5. The mechanical seal assembly of claim 1, wherein a spring biasing device for applying the biasing force is provided.

* * * * *